US007795566B2

(12) United States Patent
Koenig (10) Patent No.: US 7,795,566 B2
(45) Date of Patent: Sep. 14, 2010

(54) EXCLUSION ZONE GUIDANCE METHOD FOR SPACECRAFT

(75) Inventor: Jesse D. Koenig, San Diego, CA (US)

(73) Assignee: SpaceDev, Inc., Poway, CA (US)

( * ) Notice: Subject to any disclaimer, the term of this patent is extended or adjusted under 35 U.S.C. 154(b) by 0 days.

(21) Appl. No.: 12/079,928

(22) Filed: Mar. 27, 2008

(65) Prior Publication Data

US 2009/0008495 A1    Jan. 8, 2009

Related U.S. Application Data

(60) Provisional application No. 60/920,968, filed on Mar. 29, 2007.

(51) Int. Cl.
| F42B 15/01 | (2006.01) |
| B64G 1/24 | (2006.01) |
| F41G 7/00 | (2006.01) |
| F42B 15/00 | (2006.01) |
| B64G 1/00 | (2006.01) |

(52) U.S. Cl. .................. 244/3.15; 244/3.1; 244/3.11; 244/3.21; 244/158.1; 244/158.4; 244/158.8; 89/1.11; 701/1; 701/3; 701/200; 701/226; 701/300

(58) Field of Classification Search ........... 244/3.1–3.3, 244/158.1–158.4, 158.8, 172.4, 172.5, 75.1, 244/76 R, 175, 189, 190, 158.5–158.7; 701/1–28, 701/200–226, 50, 300, 301; 89/1.11; 340/945, 340/963
See application file for complete search history.

(56) References Cited

U.S. PATENT DOCUMENTS

| 3,749,335 | A | * | 7/1973 | Williams | ................ 701/200 |
|---|---|---|---|---|---|
| 3,949,954 | A | * | 4/1976 | Lipsey | ................ 244/3.15 |
| 4,315,609 | A | * | 2/1982 | McLean et al. | ............ 244/3.14 |
| 5,646,855 | A | * | 7/1997 | Jones et al. | ................ 701/206 |
| 5,785,279 | A | * | 7/1998 | Gregory | ................ 244/158.4 |
| 5,963,150 | A | * | 10/1999 | Bail | ................ 701/300 |
| 6,064,939 | A | * | 5/2000 | Nishida et al. | ................ 701/14 |
| 6,134,500 | A | * | 10/2000 | Tang et al. | ................ 701/202 |
| 6,142,411 | A | * | 11/2000 | Cobleigh | ................ 244/3.14 |
| 6,362,751 | B1 | * | 3/2002 | Upparapalli | ................ 701/209 |
| 6,511,020 | B2 | * | 1/2003 | Higgins | ................ 244/158.4 |
| 6,697,717 | B2 | * | 2/2004 | Shioda et al. | ................ 701/22 |
| 6,726,152 | B2 | * | 4/2004 | Higgins | ................ 244/158.4 |
| 6,744,382 | B1 | * | 6/2004 | Lapis et al. | ................ 340/963 |
| 6,866,231 | B2 | * | 3/2005 | Higgins | ................ 244/158.4 |
| 6,934,615 | B2 | * | 8/2005 | Flann et al. | ................ 701/50 |
| 6,952,001 | B2 | * | 10/2005 | McKendree et al. | ......... 244/3.1 |
| 7,053,797 | B2 | * | 5/2006 | Taylor | ................ 340/945 |
| 7,225,063 | B2 | * | 5/2007 | Tart et al. | ................ 701/4 |
| 7,228,232 | B2 | * | 6/2007 | Bodin et al. | ................ 701/301 |
| 7,256,728 | B1 | * | 8/2007 | Kenny et al. | ................ 340/963 |
| 7,379,795 | B2 | * | 5/2008 | Arnouse | ................ 701/3 |
| 7,493,197 | B2 | * | 2/2009 | Bitar et al. | ................ 701/14 |
| 7,499,794 | B1 | * | 3/2009 | Bailey et al. | ................ 340/961 |

(Continued)

*Primary Examiner*—Bernarr E Gregory
(74) *Attorney, Agent, or Firm*—Fred C. Hernandez; Mintz, Levin, Cohn, Ferris, Glovsky and Popeo, P.C.

(57) ABSTRACT

Systems and methods for are adapted for automatic implementation of exclusion zone avoidance for target-tracking vehicles, such as spacecraft. The systems and methods are configured to monitor pointing commands (commanded attitude and angular rates) generated for target tracking, and modify these commands as necessary to avoid pointing a boresight into an exclusion zone.

10 Claims, 6 Drawing Sheets

U.S. PATENT DOCUMENTS

| | | | |
|---|---|---|---|
| 7,512,462 B2* | 3/2009 | Nichols et al. | 701/3 |
| 2001/0045494 A1* | 11/2001 | Higgins | 244/158.1 |
| 2003/0025041 A1* | 2/2003 | Higgins | 244/158.1 |
| 2003/0034422 A1* | 2/2003 | Higgins | 244/158.1 |
| 2003/0055540 A1* | 3/2003 | Hansen | 701/3 |
| 2003/0055564 A1* | 3/2003 | Tart et al. | 701/301 |
| 2003/0078707 A1* | 4/2003 | Shioda et al. | 701/22 |
| 2004/0193349 A1* | 9/2004 | Flann et al. | 701/50 |
| 2006/0025900 A1* | 2/2006 | Arnouse | 701/10 |
| 2006/0106506 A1* | 5/2006 | Nichols et al. | 701/3 |

\* cited by examiner

- Exclusion Zone
- Tracking Pointing
- Modified Pointing a) High Cross-boresight Rate b) Low Cross-boresight Rate, 1/5 of High Rate c) Low Cross-boresight Rate, Intersection not Through Middle of Exclusion Zone d) Deceleration from High to Low Cross-boresight rate

EXCLUSION ZONE GUIDANCE METHOD FOR SPACECRAFT

REFERENCE TO PRIORITY DOCUMENT

This application claims priority of U.S. Provisional Patent Application Ser. No. 60/920,968 filed Mar. 29, 2007. Priority of the aforementioned filing date is hereby claimed and the disclosure of the Provisional Patent Application is hereby incorporated by reference in its entirety.

BACKGROUND

The present disclosure relates to a method for guiding a body that is tracking a target object, such that the tracking axis is prevented from pointing within a certain prohibited zone, while the duration of compromised tracking is minimized. In particular, the present disclosure relates to guiding a spacecraft.

It is often desirable for a spacecraft or some other body or vehicle in space, air, water or on land to track one or more objects, such as missiles, that are moving relative to the body, where tracking is defined as maintaining a body axis (such as the boresight of a sensing instrument) pointed at the object. In some of these cases, there may be additional constraints on the pointing of that axis, which supersede the goal of tracking. Such a case is the situation where it is desirable to avoid pointing a sensing instrument at a predetermined object or location. For example, a sensing instrument may be damaged if its boresight is pointed too close to the sun. In such a case, the boresight must be prevented from pointing within an exclusion zone, defined as the set of vectors that are less than a certain angle from the sun vector.

The target object may have a trajectory relative to the vehicle such that to track the target continuously, the boresight would have to pass through the exclusion zone. If the highest priority is to prevent the boresight from pointing into the exclusion zone, then the goal of tracking the target must be sacrificed temporarily in this situation. In robotic applications wherein the vehicle's guidance navigation and control (GNC) are handled autonomously without a human in the loop, there is desirably an automatic attitude (pointing direction, or angular orientation) guidance method to achieve the exclusion zone avoidance. This is not a trivial matter.

For example, a relatively simple method would be as follows: for each target-tracking attitude command that would point the boresight inside the exclusion zone, modify that command such that the boresight points along the vector which is as close as possible to the original vector while also being outside the exclusion zone. For a target trajectory requiring the boresight to pass through the exclusion zone, this method would result in a commanded attitude profile (a set of attitude commands over time) for which the boresight pointing approached the exclusion zone right up to the boundary, traced the boundary around to the point where the target-tracking pointing would exit the exclusion zone, and then resumed tracking. However, this method would not suffice. The actual vehicle has dynamic limits, that is, limits on its capabilities for angular rates and angular accelerations. The method described above could cause high commanded rates, and would certainly cause high commanded accelerations at the first and last intersections with the exclusion zone boundary, exceeding the vehicle's dynamic limits. Then, while the vehicle's feedback control system would attempt to make the vehicle follow the commands, it would not be able to, and the boresight would enter the exclusion zone.

To successfully avoid the exclusion zone, the avoidance maneuver must be initiated before the point where the tracking pointing would enter the exclusion zone. Also, the faster the tracking pointing is approaching the exclusion zone, the further in advance the maneuver must be initiated in order to generate a pointing profile that avoids the exclusion zone, but remains within the vehicle's dynamic limits. So then, another method could be designed with a conservative strategy such that the boresight avoided the exclusion zone always using a pointing path that would remain within dynamic limits for the maximum possible approach rate (the maximum possible angular rate at which the tracking pointing could approach the exclusion zone), and thus for all possible approach rates. However, this is an unfavorable strategy because although the highest priority is to keep the boresight out of the exclusion zone, it is also a high priority to minimize the duration of compromised tracking. The conservative method described above would cause unnecessarily long durations of compromised tracking in situations where the tracking pointing crossed the exclusion zone with approach rates lower than the maximum possible.

Also, a predictive method could be designed which takes the current situation and extrapolates it into the future, propagating forward the vehicle's and target's relative positions. Then, with the predicted tracking pointing profile, the method would design an optimal avoidance profile. This is unfavorable due to its high complexity and high computational requirements.

SUMMARY

Thus, there exists a need for improved methods and devices that use only measurements and sensing of the present situation at any given time, without propagation, to perform an exclusion zone avoidance maneuver. The improved methods and devices desirably can modify target-tracking attitude commands such that the resulting attitude command profile avoids pointing the boresight into the exclusion zone, remains within the vehicle's dynamic limits, and minimizes the duration of compromised tracking.

In one aspect, there is disclosed a method for guiding a body that is performing a function relative to an attitude trajectory, the method comprising: identifying a body having a body axis and a set of dynamic limits; determining that a projection of the body axis will intersect an exclusion zone if the body follows an original desired attitude trajectory; and modifying attitude commands to steer the projection of the body axis around the exclusion zone, wherein the attitude commands are modified in such a way that associated rates and accelerations are within dynamic limits of the body and wherein the attitude commands are modified in such a way as to minimize the amount of time for which an original desired attitude trajectory of the body is modified.

Other features and advantages will be apparent from the following description of various embodiments, which illustrate, by way of example, the principles of the disclosed devices and methods.

DETAILED DESCRIPTION

While the present systems and methods are described with respect to a spacecraft, the systems and methods may be adapted to be used in various applications known in the art, including both military and civilian applications. The systems and methods described herein are not limited for usage with spacecrafts, but can rather be used in connection with any device that is guided to certain desired attitudes, including submarines, aircraft, drones, etc. Also, it should be appreciated that while the method is described in the context of a target-tracking application, the method may be applied in modes and systems that do not involve target tracking.

Target tracking is a typical application where the method is highly useful, and target tracking is referenced throughout the description to facilitate discussion of the method's workings. In the description, mentions of the target-tracking pointing, or the target-tracking boresight pointing, or attitude guidance commands for these paintings, represent the attitude guidance method to which the exclusion zone avoidance method is applied, and which may be target tracking or may be some other form of attitude guidance. In addition, the systems and methods described herein may be applied to aerospace systems, telecommunication systems, intelligent transportation systems, global positioning systems, and other systems known in the art.

Disclosed are systems and methods for automatic implementation of exclusion zone avoidance for target-tracking vehicles, such as spacecraft. Generally, the target will be in motion relative to the spacecraft. The primary task for the spacecraft is to track the target, that is, to orient and rotate itself as necessary to maintain its instrument boresight pointed at the target. However, this primary task can be superseded by the requirement to not point the boresight into some angular exclusion zone, defined as falling within a certain angle from a vector, such as the vector from the spacecraft to the sun. The systems and methods are adapted to monitor the pointing commands (commanded attitude and angular rates) generated for target tracking, and modify these commands as necessary to avoid pointing the boresight into the exclusion zone.

In an embodiment, the preference is to not modify the pointing commands unless necessary, because it is desired that target tracking be maintained as consistently as possible. When it is necessary to modify the commands, the preference is to modify them as little as possible, and for the shortest possible duration needed to avoid the exclusion zone. Also, the pointing commands resulting from the exclusion zone avoidance modifications desirably remain within the spacecraft's rate and acceleration limits, so that the spacecraft will be able to follow the commands, and especially so that the boresight will not stray from the commands into the exclusion zone. Thus, the systems and methods are adapted to automatically use the present tracking pointing commands to apply modifications only when necessary to guide the spacecraft around, instead of through, the exclusion zone, and are configured such that the resulting commands are within the spacecraft's dynamic limits, and the boresight is pointed away from the target for the shortest possible duration.

Figure 1:
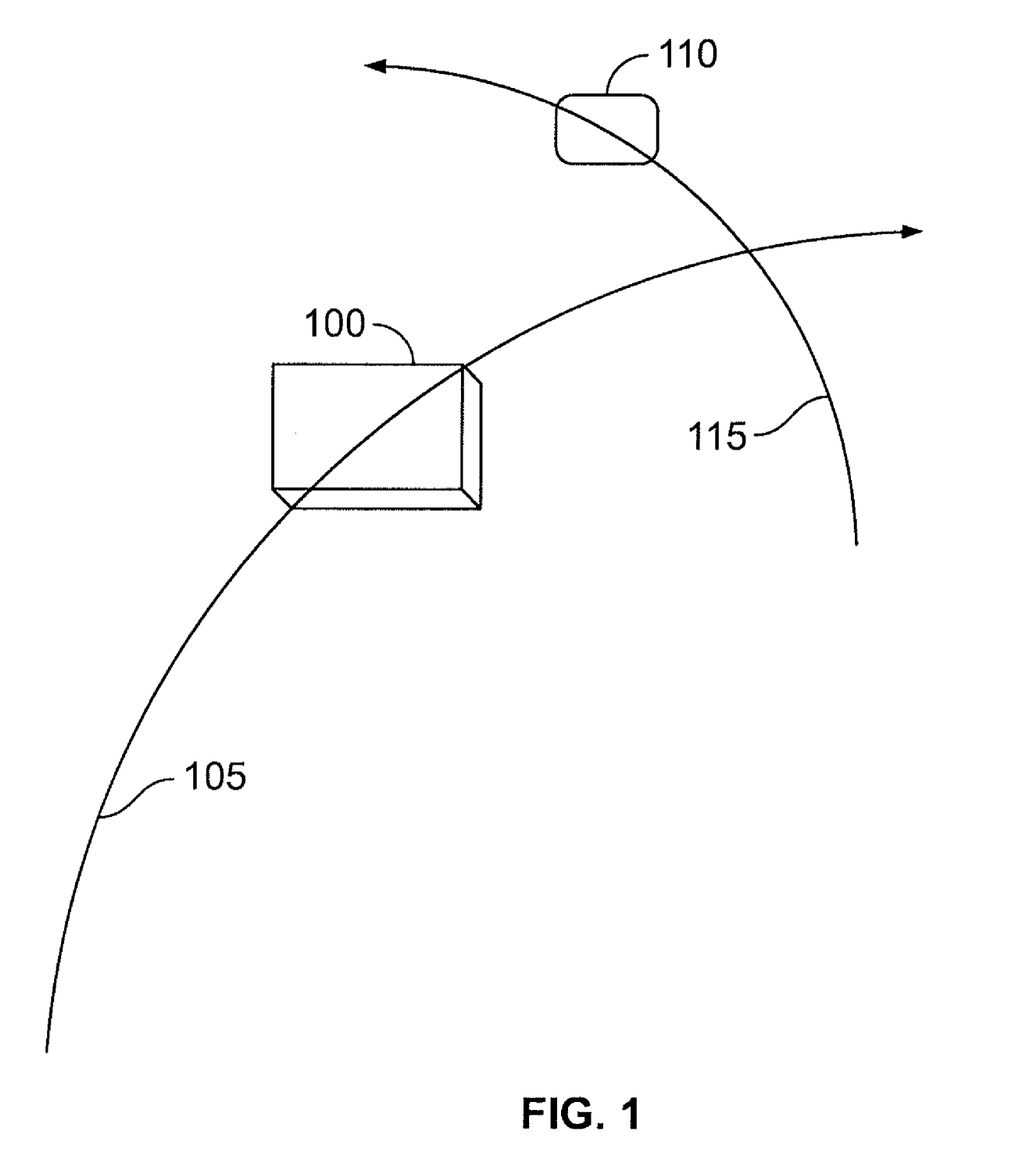
FIG. 1 shows a vector and schematic view of a spacecraft, and a target to be tracked by that spacecraft.

FIG. 1 shows a vector and schematic view of a spacecraft and a target to be tracked. The spacecraft 100 is shown moving along a trajectory, such as an orbit 105, relative to a celestial body. A moving target 110 to be tracked is also moving along a trajectory 115 relative to the spacecraft 100.

The spacecraft 100 has a sensing instrument with a boresight axis. For target tracking, the spacecraft's attitude and angular rates are guided such that the boresight axis remains continuously pointed at the target 110, as the spacecraft moves along its trajectory 105 and the target moves along its trajectory 115. Pursuant to one aspect of the invention, exclusion zone avoidance is performed while causing the minimum possible disturbance to the tracking performance.

As mentioned, although described in the context of a spacecraft 100, it should be appreciated that the disclosed systems and methods can be adapted for use with other devices that employ tracking of moving targets, or more generally, which require attitude guidance. Thus, the present invention is not limited to use with spacecrafts. For clarity of illustration, the structural details of the spacecraft 100 and of the target 110 are not shown in FIG. 1. It should be appreciated that the spacecraft 100 and the target 110 can have various structural configurations.

Figure 2:
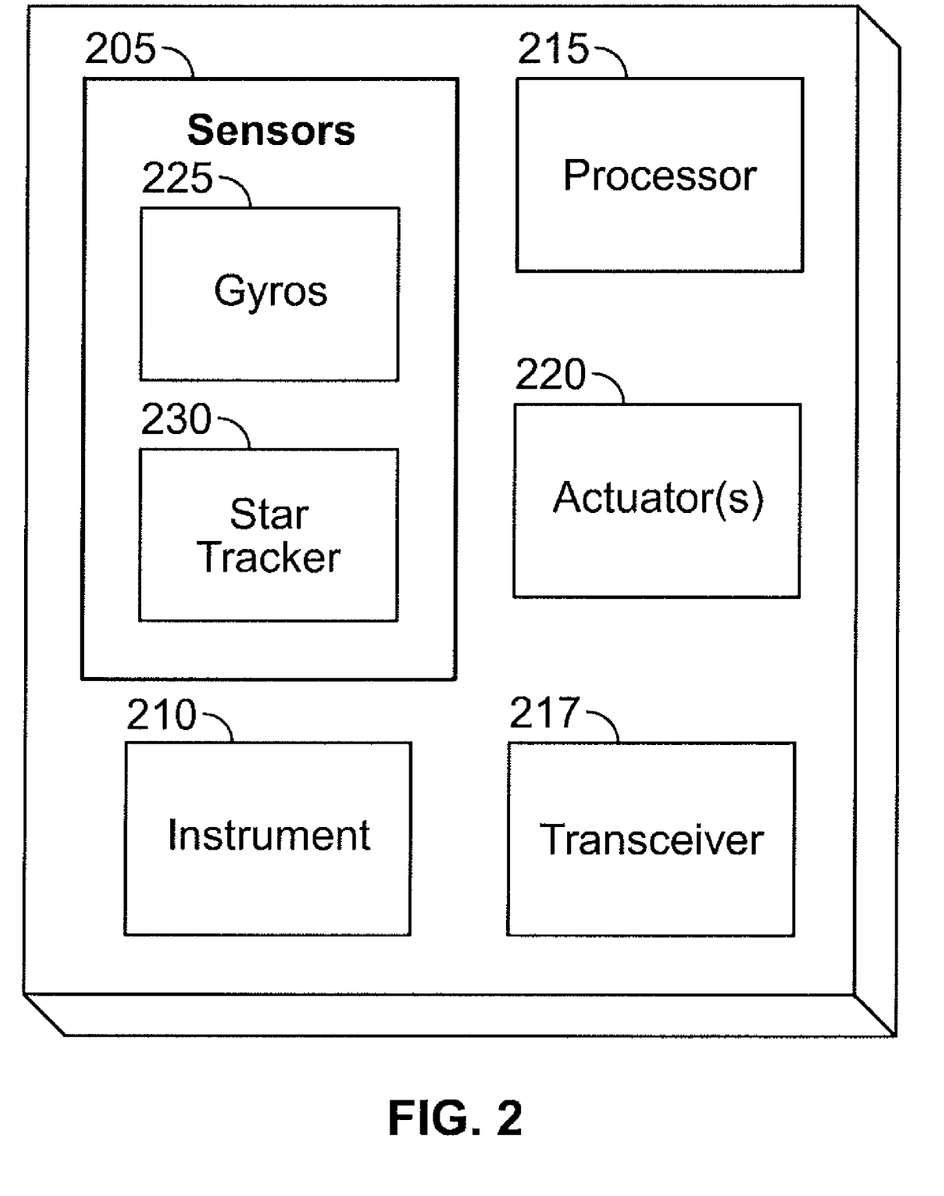
FIG. 2 shows a schematic view of an exemplary spacecraft.

FIG. 2 shows a schematic view of the spacecraft 100, which may include various electronic and software components. The components described in FIG. 2 are for example only and it should be appreciated that the spacecraft 100 is not limited to the configuration shown in FIG. 2. The spacecraft 100 may include multiple sensors 205 for the estimation of the attitude and rates of the spacecraft 100. The pointing commands for target tracking may be determined and generated by a main processor 215 using signals from the sensing instrument 210, or received from another spacecraft or ground stations via a transceiver 217. The processor 215 performs the exclusion avoidance method, applying modifications to the target-tracking pointing commands as necessary to avoid the exclusion zone. The Attitude Determination System (ADS) estimates the current state, that is, for example, attitude and angular rates, using software methods combined with signals received from the sensors 205. The Attitude Control System (ACS) keeps the estimated states as close as possible to the commanded states by using software methods to generate a torque signal which is received by a control actuator 220, which in turn provides the torques and thus angular accelerations to effect the pointing commands of the spacecraft 100.

The sensors 205 may include gyros 225, star trackers 230, or other sensors known in the art for the estimation and determination of the attitude of the spacecraft 100. Any quantity of each of the sensors 205 may be utilized. The processor 215 may be microprocessor-based such as a computer having a central processing unit, memory (RAM and/or ROM), and associated input and output buses. The processor 215 may be an application-specific integrated circuit or may be formed of other logic devices known in the art. The processor 215 may be a portion of a central control unit or may be a stand-alone processor, as shown. The aforementioned software methods may reside on the processor 215; these methods include those for the ADS and the ACS, as well as the exclusion avoidance method disclosed herein, and other attitude guidance methods.

The control actuator 220 is generally a torque-generating device and may be in various forms. The control actuator 220 may include multiple thrusters, reaction wheels, control moment gyros, magnets, some combination of these, or may be in some other form known in the art.

Figure 3:
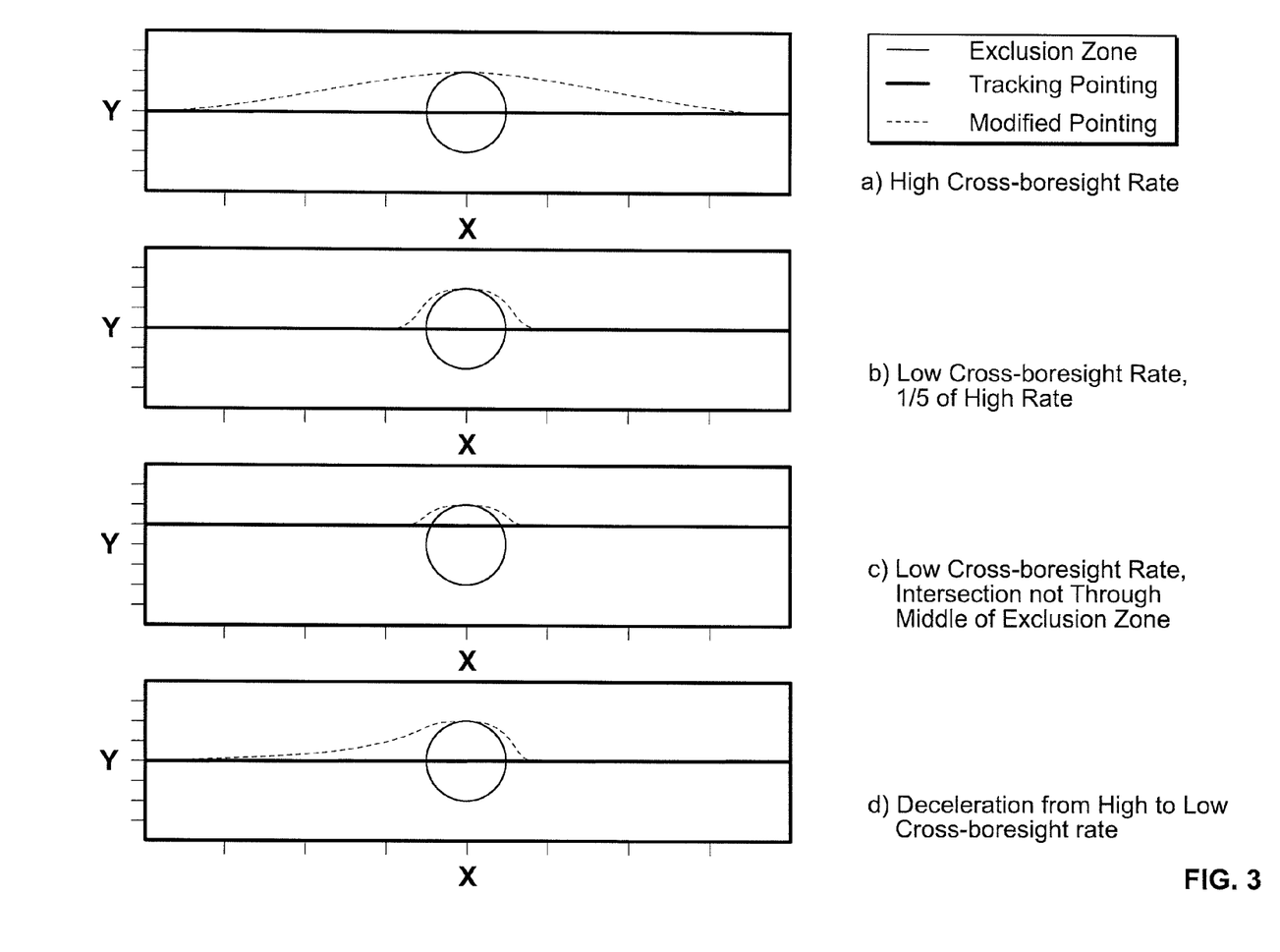
FIG. 3 shows two-dimensional representations of several hypothetical exclusion zone avoidance maneuvers.

FIG. 3 shows representations of four hypothetical cases, each of which is illustrated by a flattened portion of an attitude sphere, as follows: The spacecraft is located at the center of the sphere. The lines represent the intersection with the sphere of particular sets of pointing vectors originating from the spacecraft, that is, the center of the sphere. The X and Y axes measure the coordinates of an angular position relative to the center of the exclusion zone. X is in the direction of the cross-boresight rate (the angular rate minus any rate components about the boresight axis) required for target tracking, and Y is in the direction perpendicular to X. In an embodiment, the exclusion zone avoidance method applies an offset in the Y direction only, to the target-tracking boresight pointing command.

The circle represents the boundary of the exclusion zone. The dashed line represents the boresight pointing that would be required to track the target. The heavy line represents the boresight pointing that is commanded by the exclusion avoidance method. In each of the four cases, continuous target tracking would cause the boresight to pass through the exclusion zone. Therefore, in each case, the method applies modifications to the tracking pointing commands, such that target tracking is temporarily compromised in order to steer the boresight around the exclusion zone.

Still with reference to FIG. 3, in Case "a", a high cross-boresight rate is required to track the target. Based on the high approach rate, the exclusion avoidance method begins modifying the pointing commands far from the exclusion zone.

In Case "b", the approach rate is ⅕ of that in Case "a", and the method therefore allows the boresight to get much closer to the exclusion zone before modifying the pointing commands.

It is important to note that with the approach rate of Case "a", if the pointing path of Case "b" were attempted, the required angular rates and accelerations would exceed the spacecraft's dynamic limits. Then the spacecraft would not be able to follow the commands, which would cause the boresight to overshoot the desired path and enter the exclusion zone. Conversely, with the approach rate of Case "b", the spacecraft would easily be able to follow the pointing path of Case "a". However, in that scenario it would be deviating from target pointing for an unnecessarily long duration.

In Case "c", the cross-boresight rate is the same as in Case "b", but the pointing trajectory crosses through the exclusion zone at a quarter of the zone's diameter, instead of through the center. Therefore, the maximum required deviation from target tracking is smaller. The exclusion avoidance method automatically accounts for this, guiding a pointing trajectory that avoids the exclusion zone, stays within the spacecraft's dynamic limits, and does not deviate further than necessary from target tracking.

In Case "d", the target-tracking pointing decelerates from a high approach rate on the left side of the plot, equal to that of Cases "a" and "c", to a low rate on the right side of the plot, equal to that of Case "b". The exclusion avoidance method adapts to the changing rate: the modified pointing commands deviate from target tracking well in advance of the exclusion zone when the cross-boresight tracking rate is high, so that the spacecraft won't overshoot the commands and point the boresight into the exclusion zone; then as the cross-boresight tracking rate decreases, the pointing commands follow a tighter trajectory around the exclusion zone because with the lower cross-boresight rates this tighter trajectory is within the spacecraft's dynamic limits, and it allows target tracking to resume quickly.

Figure 4A:
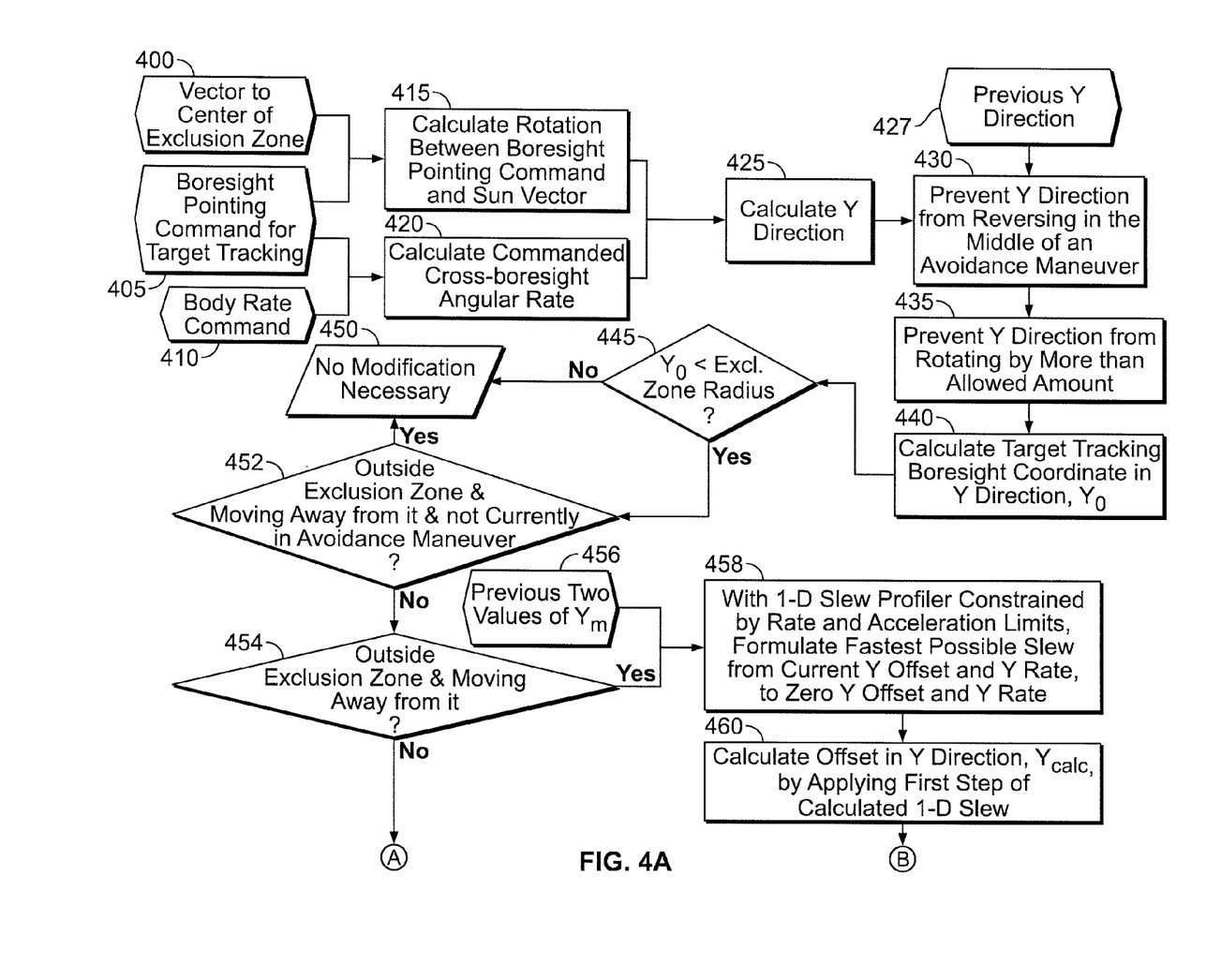
FIGS. 4a and 4b show a flow diagram illustrating a method of generating the attitude commands to perform an exclusion zone avoidance maneuver.
Figure 4B:
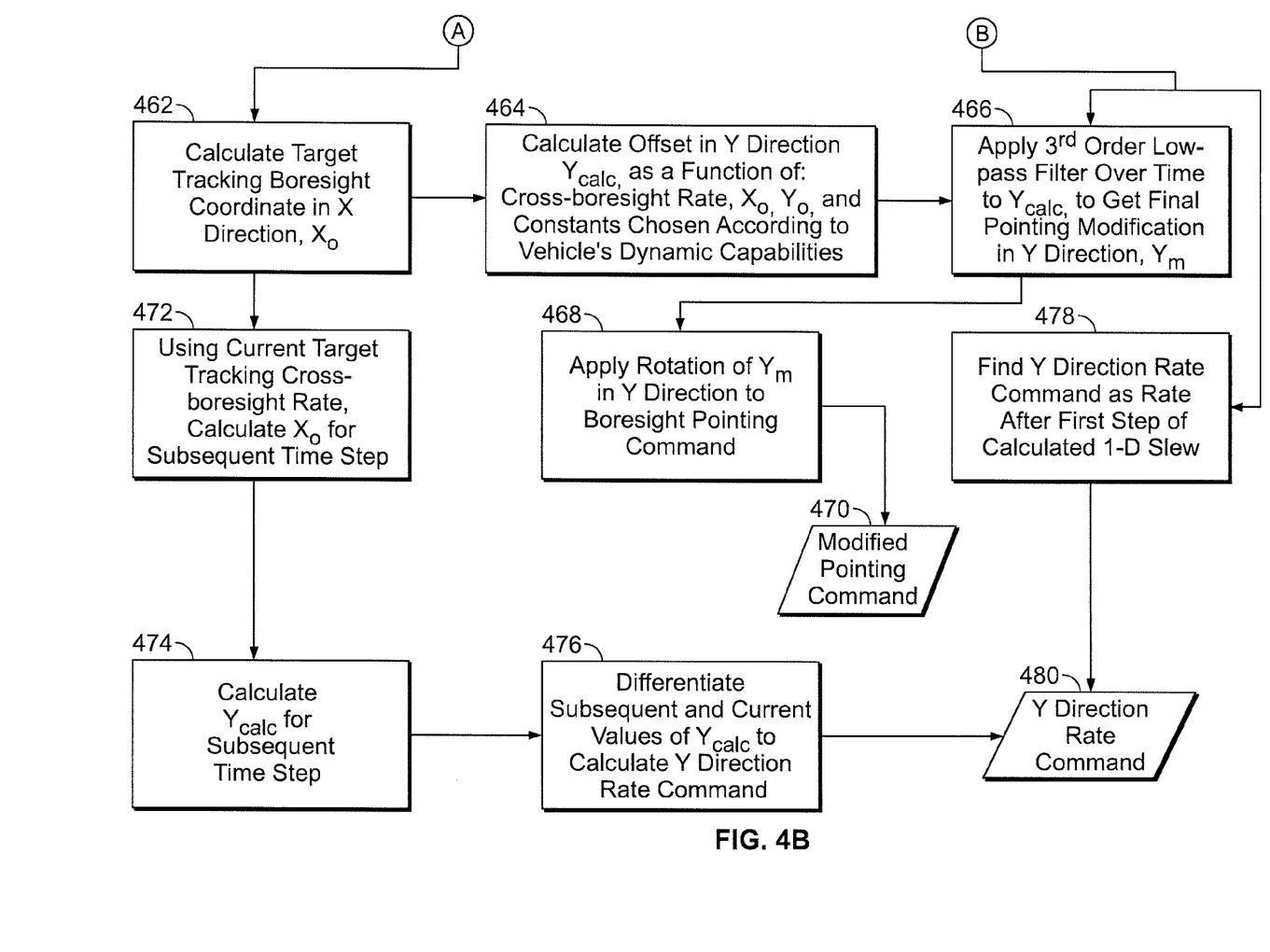

FIGS. 4a and 4b show a flow diagram of an exemplary exclusion zone avoidance method. The diagram illustrates a process that is executed at every time step for which an attitude command is given to the ACS. This is the case whenever the method is enabled. There may be certain operational modes of the spacecraft in which the exclusion zone is not a concern and for which the method is therefore disabled.

It is important to note the distinction between a time step and a numbered method step. The entire method is executed within every time step, whereas a step named with a number represents one of the many sequential operational elements that comprise the method.

The input 400 is the unit vector from the spacecraft to the center of the exclusion zone. For example, the exclusion zone may be around the sun, in which case input block 400 would be the unit vector from the spacecraft to the sun, $\hat{s}$ (Thus, this vector will be referred to as the sun vector henceforth.)

The input 405 is the current boresight pointing command for target tracking, which comes from a separate attitude guidance method for target tracking or target acquisition. The target-tracking boresight pointing command may be expressed as a unit vector, $\hat{b}$.

The input 410 is the spacecraft's current angular rate command for target tracking, $\vec{\omega}$, generated by the same attitude guidance method that produces input 405.

In step 415, the axis $\hat{a}_{sb}$ of the rotation between the boresight pointing command and the sun vector is calculated as follows:

$$\hat{a}_{sb} = \frac{\hat{s} \times \hat{b}}{|\hat{s} \times \hat{b}|}.$$

In step 420, the axis $\hat{\omega}_c$ and magnitude $\omega_c$ of the commanded target-tracking cross-boresight rate are calculated as follows:

$$\vec{\omega}_c = \vec{\omega} - \hat{b} * (\hat{b} \cdot \vec{\omega});$$

$$\omega_c = |\vec{\omega}_c|;$$

$$\hat{\omega}_c = \frac{\vec{\omega}_c}{\omega_c}.$$

In the next step 425, the Y direction, $\hat{Y}$ (as described with reference to FIG. 3) is calculated as follows:

$$\hat{Y} = \frac{\hat{a}_{sb} - \hat{\omega}_c * (\hat{a}_{sb} \cdot \hat{\omega}_c)}{|\hat{a}_{sb} - \hat{\omega}_c * (\hat{a}_{sb} \cdot \hat{\omega}_c)|}.$$

In step 430, the Y direction is prevented from reversing direction in the middle of an avoidance maneuver. If the target-tracking pointing is heading very close to the sun vector, then a slight change in the target-tracking rate could change the heading from one side of the sun vector to the other, causing $\hat{Y}$ to change by nearly 180°, effectively reversing the Y direction from one time step to the next. This is prevented so that the commanded rates and accelerations from the exclusion zone avoidance method don't exceed the spacecraft's dynamic limits, and also so that the commands from the method don't lead the boresight to cross through the exclusion zone.

To effect the objective of step 430, the method checks whether an exclusion zone avoidance maneuver is underway by checking whether any of the applied Y offsets in a certain number of the immediate past time steps has been above a certain threshold. If this is the case (an exclusion zone avoidance maneuver is underway), the current Y direction, $\hat{Y}$, is not allowed to reverse from the previous Y direction, $\hat{Y}_p$ (input 427), as follows:

if $\hat{Y} \cdot \hat{Y}_p < 0$, $\hat{Y} = -\hat{Y}$;

end.

In the next step 435, an angle $\Delta Y_{max}$ is defined as follows:

$$\Delta Y_{max} = \frac{K_1 * \omega_{max} * t_{step}}{r},$$

where $K_1$ is a constant to be set for desired performance, $\omega_{max}$ is the spacecraft's angular rate limit, $t_{step}$ is the time step between attitude commands, and r is the angular radius of the exclusion zone.

Then, still in step 435, the Y direction is prevented from rotating by more than a certain angle, to maintain the attitude commands within the spacecraft's dynamic limits. If the rotation between $\hat{Y}_p$ and $\hat{Y}$ is of an angle greater than $\Delta Y_{max}$, $\hat{Y}$ is redefined by a rotation from $\hat{Y}_p$ in the same direction, but only by the angle $\Delta Y_{max}$.

In the next step 440, the $\hat{Y}$ coordinate, $Y_0$, of the current target-tracking pointing is calculated as follows:

$\vec{\omega}_i = \hat{Y} \times \vec{b}$, such that $\vec{\omega}_i$ is a vector roughly parallel to $\vec{\omega}_c$, but normal to $\hat{Y}$, and thus not exactly parallel to $\vec{\omega}_c$ if $\hat{Y}$ was altered in step 435;

$$\hat{i} = \frac{(\vec{\omega}_i \times \hat{s}) \times \vec{\omega}_i}{|(\vec{\omega}_i \times \hat{s}) \times \vec{\omega}_i|};$$

if $\hat{i} \cdot \hat{s} < 0$, $\hat{i} = -\hat{i}$;

end;

($\hat{i}$ is a vector offset from the sun vector in the Y direction, and such that the target-tracking pointing is heading toward $\hat{i}$. In an attitude sphere representation, this would be the intersection closest to the sun vector of two great circles: the one normal to $\vec{\omega}_i$ and containing $\vec{b}$; the one normal to $\hat{Y}$ and containing the sun vector.)

$Y_0 = \cos^{-1}(\hat{i} \cdot \hat{s})$;

if $(\vec{\omega}_i \times \hat{i}) \cdot (\hat{i} \times \hat{s}) < 0$, $Y_0 = -Y_0$;

end.

In decision step 445, if $Y_0$ is less than r, the method goes to decision step 452; otherwise the method goes to output step 450.

In decision step 452, if the target-tracking pointing is outside of the exclusion zone, and is moving away from the exclusion zone, and an avoidance maneuver is not currently underway (checked as in step 430), the method goes to output step 450; otherwise the method goes to decision step 454.

If the method reaches output step 450, the target-tracking pointing is currently outside the exclusion zone, and not heading toward the exclusion zone, and an avoidance maneuver is not currently underway. In this case, the method is terminated for the current time step, with no modification applied to the target-tracking boresight pointing command.

In decision step 454, if the target-tracking pointing is outside the exclusion zone and moving away from the exclusion zone, the method goes to step 458; otherwise the method goes to step 462.

If the method reaches step 458, the target-tracking pointing is currently outside the exclusion zone, and not heading toward the exclusion zone, but an avoidance maneuver is currently underway. In this case, the goal is to return the boresight to target-tracking (zero Y offset) as rapidly as possible. This is achieved via a one-dimensional (1D) slew profiler function, which calculates the fastest possible slew from the current Y offset and Y rate, to zero Y offset and zero Y rate, constrained by the spacecraft's rate and acceleration limits.

The 1D slew profiler function takes as its inputs: a desired slew duration time T1D; the predefined angular rate and acceleration limits, the initial rate, the final rate, and the range to be traversed. The function then calculates a 1D slew that starts at the initial rate and proceeds with a period of constant acceleration, followed by a period of zero acceleration (constant rate), followed by another period of constant acceleration of the same magnitude and opposite direction as the acceleration in the first period, and ends at the final rate. The duration of the constant rate period may be zero, such that the slew effectively has only two discrete periods, each containing constant acceleration. If the input T1D is left empty, as it is in the present implementation, the 1D slew profiler function will calculate the fastest possible (minimum time) slew that satisfies the remainder of the inputs.

In every time step for which the method reaches step 458, a new 1D slew is calculated, based on current conditions.

In step 460, the current desired Y offset to the target tracking pointing, $Y_{calc}$, is taken to be the position of the first time step of the slew calculated in step 458.

If the method reaches step 462, the target-tracking pointing is currently either in or headed toward the exclusion zone, and the method calculates the desired Y offset, $Y_{calc}$. In this instance, the calculation of $Y_{calc}$ depends upon the value of $X_0$, the $\hat{X}$ coordinate (as described with reference to FIG. 3) of the current target-tracking pointing.

In step 462, $X_0$ is calculated as follows:

$X_0 = \cos^{-1}(\hat{i} \cdot \hat{b})$.

In step 464, $Y_{calc}$ is calculated as follows:

$$A = r - Y_0;$$

$$n_\omega = \frac{\omega_{max} - \omega_c}{\omega_{max}}; \text{ if } n_\omega < 0, n_\omega = 0; \text{ end};$$

$$n_d = K_2 * \left(1 + n_\omega * \left(e^{-\left(\frac{X_0}{K_3 * r}\right)^{K_4}} - 1\right)\right);$$

$$n_{Y_0} = \frac{Y_0}{r};$$

$$d = n_d * \frac{A}{(1 - n_{Y_0})^{0.5}};$$

$$Y_{calc} = A * e^{-\left(\frac{X_0}{d}\right)^2},$$

where e is the base of the natural logarithm, and where $K_i$ {i=2, 3, 4} are constants that affect the shape of the exclusion zone avoidance pointing path, to be set for desired performance with consideration of the exclusion zone radius and the spacecraft's dynamic limits.

Both steps 460 and 464 lead to step 466.

In step 466, regardless of how $Y_{calc}$ was calculated, a $3^{rd}$ order low-pass filter over time is applied to $Y_{calc}$ to smooth its time-profile. The filter constants are chosen based on the spacecraft dynamics and ACS performance. The output from the filter is $Y_m$, the Y offset from target-tracking pointing of the final modified boresight pointing command.

In step 468, a rotation of angle $Y_m$, about axis $\hat{Y}$, is applied to the target-tracking pointing to give the final modified boresight pointing command.

The output 470 is the modified boresight pointing command.

For vehicles in which the ACS takes as input a rate command in addition to an attitude command, the method calculates a Y direction rate command, $\omega_Y$, in a manner that often produces improved performance as compared to obtaining it by simply differentiating successive $Y_{calc}$ values. $\omega_Y$ is integrated into the full three-dimensional (3D) angular rate command by a method outside of the exclusion zone guidance method, which often produces improved performance as compared to obtaining the 3D angular rate command by simply differentiating successive 3D attitude commands. $\omega_y$ is only calculated in the time steps wherein a value of $Y_m$ is applied to modify the boresight pointing command, i.e. in time steps wherein the exclusion zone guidance method reaches step 470. The calculation of $\omega_Y$ begins with step 472 in time steps wherein the method reaches step 462, and with step 478 in time steps wherein the method reaches step 458.

In step 472, $\omega_c$, the magnitude of the commanded target-tracking cross-boresight rate, is used to extrapolate an estimate of the value of $X_0$ at the next time step, $X_{0\_Next}$ as follows:

if [target-tracking pointing is moving away from exclusion zone], $X_{0\_Next}=|X_0+\omega_c*t_{step}|;$ else, $X_{0\_Next}=|X_0-\omega_c*t_{step}|;$ end.

In step 474, an estimate of the value of $Y_{calc}$ at the next time step, $Y_{calc\_Next}$ is calculated in the same way as $Y_{calc}$ is in step 464, but now using $X_{0\_Next}$ instead of $X_0$.

In step 476, $Y_{calc\_Next}$ and $Y_{calc}$ are differentiated to give $\omega_Y$, as follows:

$$\omega_Y = \frac{Y_{calc\_Next} - Y_{calc}}{t_{step}}.$$

In step 478, $\omega_Y$ is taken to have the value of the rate reached subsequent to first time step of the 1D slew calculated in step 458.

Both steps 476 and 478 lead to output 480, which is $\omega_Y$.

The exclusion zone guidance method does not provide attitude guidance for the angular degree of freedom about the boresight axis. If it is desired that this angle be controlled, a separate attitude guidance method is required to be applied in each time step, after the exclusion zone guidance method has executed.

Figure 5:
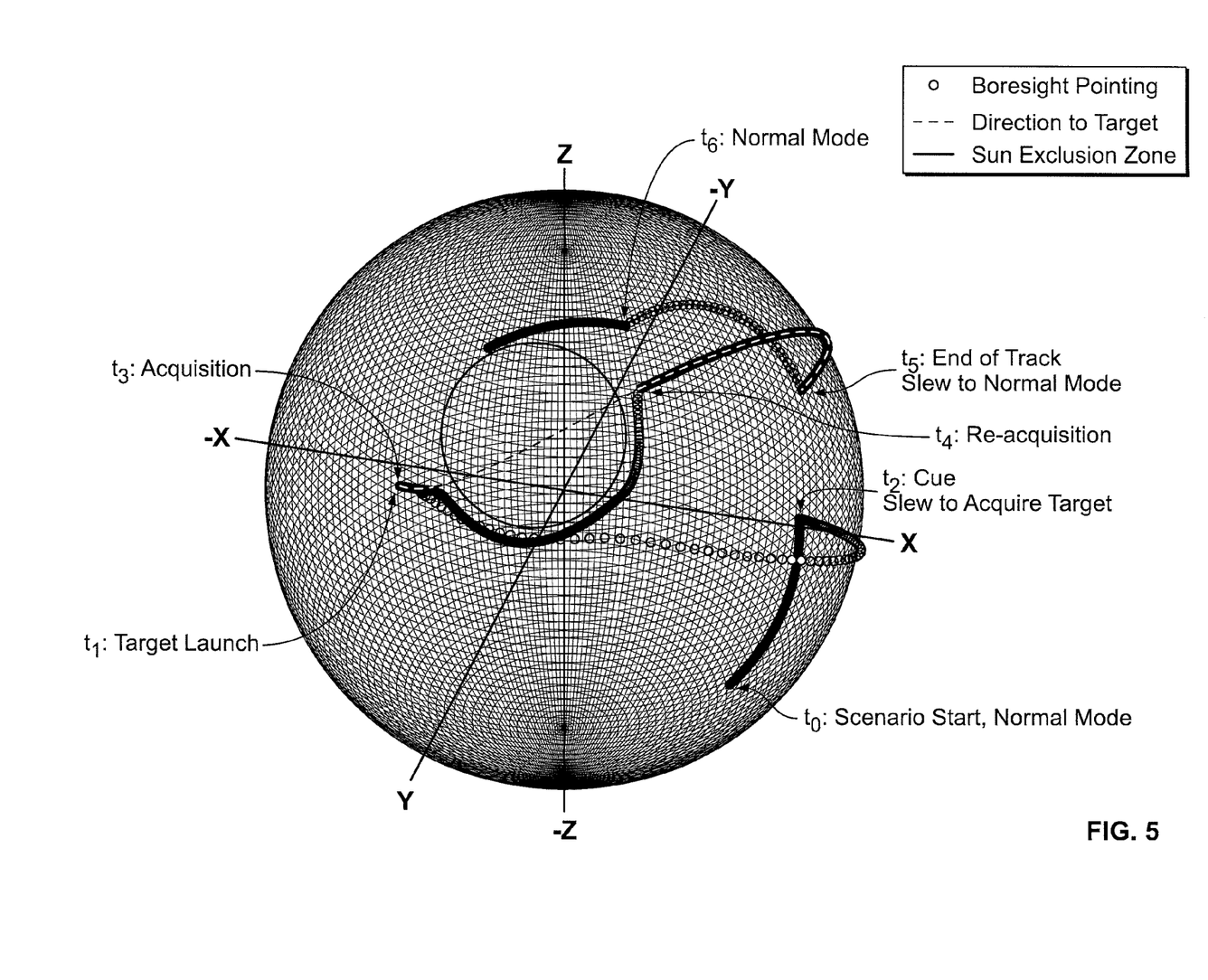
FIG. 5 shows a three-dimensional representation of an exemplary, simulated exclusion zone avoidance maneuver.

FIG. 5 shows a three-dimensional representation of a simulated spacecraft scenario where the exclusion zone avoidance method is active. The sphere in the illustration represents an attitude sphere as described with reference to FIG. 3. In FIG. 5, the whole attitude sphere is shown instead of the flattened portion of the sphere shown in FIG. 3. Again, the spacecraft (or other body) may be imagined to be located at the center of the sphere.

In FIG. 5, the small circles on the surface of the sphere represent the pointing directions of the instrument boresight axis over time, showing where the axis would intersect the sphere. These circles are separated by constant time intervals, such that the relative angular rate of the spacecraft may be inferred from their spacing on the sphere. When they are closer together, the spacecraft is moving more slowly, and vice versa. The dashed line represents pointing vectors from the spacecraft to the target over time, showing the intersection with the sphere of those vectors.

In FIG. 5, the large circle on the sphere represents the exclusion zone. In this case, it is an exclusion zone around the sun vector, so the intersection with the sphere of the pointing vector from the spacecraft to the sun would be the center point of the circle. Any boresight pointing that falls within this circle would be within the exclusion zone, and is to be avoided. For extra safety, an exemplary 2° pad has been added to the exclusion zone, so the effective exclusion zone used by the avoidance method has a 2° larger radius than the circle as drawn. Thus, the boresight pointing should not come within 2° of the circle. It should be appreciated that the 2° pad is exemplary and that other pad values can be used.

At initial time $t_0$, the scenario begins. The spacecraft is in "normal mode" where the attitude guidance is provided by other methods. In normal mode, the exclusion zone avoidance method is disabled because the instrument boresight remains pointed far from the exclusion zone due to other factors.

At time $t_1$, the target commences its trajectory. As mentioned, the target can be, for example, a missile that is launched from a location on a planet. It should be appreciated that the target can be any other moving object that moves along a trajectory. It can be seen in FIG. 5 that soon after launch, the target pointing vector crosses through the exclusion zone.

At time $t_2$, the spacecraft is cued with the target trajectory data. This cue may come from another spacecraft or via communication from the ground. A separate attitude guidance method then uses this data to provide attitude commands to the ACS, such that the spacecraft slews to point the instrument boresight at the target. When the cue is received and the slew is initiated, the exclusion zone avoidance method is enabled.

The small circles between times $t_2$ and $t_3$ represent the boresight pointing during the slew to acquire the target. The circles in this section are relatively highly spaced because the spacecraft has a relatively high cross-boresight rate during this period. In the scenario represented in FIG. 5, the slew to acquisition would cause the boresight to pass slightly through the sun exclusion zone, if the exclusion zone avoidance method were not enabled. However, since the method is enabled, it modifies the pointing commands where necessary to steer the boresight pointing around the exclusion zone. This can be seen as a slight deviation in the path of the highly spaced small circles shortly before $t_3$.

It should be noted that in the simulation depicted in FIG. 5, the small circles show the actual boresight pointing directions, not the commanded boresight pointing directions. If the exclusion zone avoidance method were not performing properly, it would be possible to command the boresight to steer around the exclusion zone, but without keeping the commanded rates and accelerations within the spacecraft's limits. This could lead to the boresight actually pointing into the exclusion zone, even when it was commanded not to. The small circles in FIG. 5 show not only that the boresight is commanded to steer around the exclusion zone, but that the avoidance method is performing properly, keeping commands within the spacecraft's dynamic limits such that the spacecraft may successfully follow the pointing commands, preventing the actual boresight from pointing into the exclusion zone.

At time $t_3$, the slew is complete and the spacecraft has achieved target acquisition, meaning that the instrument boresight has been pointed at the target. Tracking then commences, meaning that the boresight is kept pointing at the target. However, after a short period of tracking, the exclusion zone avoidance method begins modifying pointing commands to again steer the boresight around the sun exclusion. This time, the deviation caused by the method is much larger and more prolonged than the deviation during the slew to acquisition. In this case, it causes the tracking to be compromised, meaning that during the exclusion zone avoidance maneuver, the instrument boresight is not pointed at the target. Generally, compromised tracking is undesirable, but here it is preferable to the alternative, which is to point the boresight into the exclusion zone and damage the instrument.

At time $t_4$, the spacecraft smoothly reacquires the target and commences tracking again. The smoothness of this reacquisition shows again that the attitude commands (including the pointing modifications generated by the exclusion zone avoidance method) remain within the spacecraft's dynamic limits.

Between times $t_4$ and $t_5$, the spacecraft tracks the target, until at $t_5$ the target trajectory ends and the spacecraft slews back to normal mode. The spacecraft reaches normal mode at $t_6$, and at that time the exclusion zone avoidance method is disabled.

A number of embodiments of the invention have been described. Nevertheless, it will be understood that various modifications may be made without departing from the spirit and scope of the invention. Accordingly, other embodiments are within the scope of the invention.

What is claimed:

1. A method for guiding the attitude of a body that is performing a function involving a rotation of the body, the method comprising:
   identifying angular dynamic limits of the body, wherein the angular dynamic limits include maximum angular rate and maximum angular acceleration of the body;
   identifying a particular body axis of concern defined by a physical element of the body;
   determining that, if the body follows an originally desired attitude trajectory, the projection of the body axis of concern will intersect an angular exclusion zone comprised of an angular region within which it is prohibited to point the body axis of concern, wherein the angular region is defined by intervals in two angular dimensions, including azimuth and elevation, as measured from a reference point about which the body rotates; and
   modifying one or more attitude commands that correspond to the originally desired attitude trajectory to create an actually commanded attitude trajectory for the body such that the body axis of concern is steered around the exclusion zone, so as to avoid any incursion of the body axis of concern with the exclusion zone, wherein the attitude commands are modified in such a way that associated angular rates and angular accelerations are within the dynamic limits of the body, and wherein the attitude commands are modified in such a way as to minimize the amount of time for which the actually commanded attitude trajectory deviates from the originally desired attitude trajectory.

2. A method as in claim 1, wherein the body is a spacecraft or a component of a spacecraft.

3. A method as in claim 1, wherein the function being performed by the body is to track a separate target object by maintaining the body axis of concern pointing at the target object so as to maintain an intersection of the projection of the body axis of concern with the target object.

4. A method as in claim 1, wherein the body axis of concern is coaxial with the boresight of a sensing instrument that is fixed to the body.

5. A method as in claim 1, wherein the exclusion zone is an angular region surrounding a vector, wherein the vector projects from the point about which the body rotates to a center of the sun.

6. A method as in claim 1, wherein the attitude commands are modified to steer the projection of the body axis of concern around a predetermined angular pad surrounding the exclusion zone.

7. A method as in claim 1, wherein the attitude commands are modified based on a axis $\hat{\omega}_c$ and a magnitude $\omega_c$ of a originally desired cross-boresight rate of the body, calculated as:

$$\vec{\omega} = \vec{\omega} - \hat{b}*(\hat{b}\cdot\vec{\omega});$$

$$\omega_c = |\vec{\omega}_c|;$$

$$\hat{\omega}_c = \frac{\vec{\omega}_c}{\omega_c},$$

where $\vec{\omega}$ is the body's originally desired angular rate command, and $\hat{b}$ is the unit vector describing the originally desired pointing of the body axis of concern.

8. A method as in claim 7, wherein the attitude commands are modified by a function of the originally desired pointing of the body axis of concern relative to the angular direction toward a center of the exclusion zone, the method comprising:
   establishing an angular coordinate system based on coordinate axes $\hat{X}$ and $\hat{Y}$, with $\hat{Y}$ defined as:

$$\hat{Y} = \frac{\hat{a}_{sb} - \hat{\omega}_c*(\hat{a}_{sb}\cdot\hat{\omega}_c)}{|\hat{a}_{sb} - \hat{\omega}_c*(\hat{a}_{sb}\cdot\hat{\omega}_c)|}$$

where $\hat{Y}$ may be altered from this formulation to prevent its changing direction by more than a specified angle from one time step to the next, and where $$\hat{a}_{sb} = \frac{\hat{s}\times\hat{b}}{|\hat{s}\times\hat{b}|}$$

where $\hat{s}$ is a unit vector describing the angular direction from the point about which the body rotates, to the center of the exclusion zone;

calculating a $\hat{Y}$ coordinate, $Y_0$, of the originally desired pointing of the body axis of concern as:

$$Y_0 = \cos^{-1}(\hat{i}\cdot\hat{s})$$

where if $$(\vec{\omega}_i\times\hat{i})\cdot(\hat{i}\times\hat{s}) < 0, Y_0 = -Y_0,$$

and where $$\hat{i} = \frac{(\vec{\omega}_i\times\hat{s})\times\vec{\omega}_i}{|(\vec{\omega}_i\times\hat{s})\times\vec{\omega}_i|}, \text{ where if } \hat{i}\cdot\hat{s} < 0, \hat{i} = -\hat{i}, \text{ and}$$

where $\vec{\omega}_i = \hat{Y}\times\hat{b}$;

calculating an $\hat{X}$ coordinate, $X_0$, of the originally desired pointing of the body axis of concern as:

$$X_0 = \cos^{-1}(\hat{i}\cdot\hat{b}).$$

9. A method as in claim 8, wherein if the originally desired projection of the body axis of concern is either inside of the exclusion zone or outside of the exclusion zone but moving angularly toward an incursion of the exclusion zone, the attitude commands are modified by applying an angular rotation of magnitude $Y_m$ about the axis $\hat{Y}$ to the originally desired attitude, where $Y_m$ is the result of applying a low-pass filter over time to $Y_{calc}$, where $Y_{calc}$ is calculated as:

$$A = r - Y_0;$$

$$n_\omega = \frac{\omega_{max} - \omega_c}{\omega_{max}}; \text{ if } n_\omega < 0, n_\omega = 0; \text{ end};$$

$$n_d = K_2 * \left(1 + n_\omega * \left(e^{-\left(\frac{X_0}{K_3 * r}\right)^{K_4}} - 1\right)\right);$$

$$n_{Y_0} = \frac{Y_0}{r};$$

$$d = n_d * \frac{A}{(1 - n_{Y_0})^{0.5}};$$

$$Y_{calc} = A * e^{-\left(\frac{X_0}{d}\right)^2},$$

where e is the base of the natural logarithm, and where $K_{i\ \{i=2,3,4\}}$ are constants that affect the shape of the exclusion zone avoidance pointing path, to be set for desired performance with consideration of the exclusion zone angular radius and the spacecraft's dynamic limits.

10. A method as in claim 8, wherein if the originally desired projection of the body axis of concern is both outside of the exclusion zone and not moving angularly toward an incursion of the exclusion zone, but the most recent attitude command was modified from the originally desired attitude, the attitude commands are modified by applying an angular rotation of magnitude $Y_m$ about the axis Y to the originally desired attitude, where $Y_m$ is the result of applying a low-pass filter over time to $Y_{calc}$, where $Y_{calc}$ is taken as the magnitude after the first time step of a 1-dimensional slew, which is formulated to bring both $Y_{calc}$ and the first derivative of $Y_{calc}$ to zero in the minimum time possible given the body's dynamic limits.

* * * * *